(12) United States Patent
Yamamoto et al.

(10) Patent No.: US 6,978,073 B2
(45) Date of Patent: Dec. 20, 2005

(54) OPTICAL FIBER ARRAY

(75) Inventors: Tsuyoshi Yamamoto, Kanagawa (JP); Yuji Uenishi, Saitama (JP); Johji Yamaguchi, Kanagawa (JP)

(73) Assignee: Nippon Telegraph & Telephone Corporation, Tokyo (JP)

( * ) Notice: Subject to any disclaimer, the term of this patent is extended or adjusted under 35 U.S.C. 154(b) by 80 days.

(21) Appl. No.: 10/323,485

(22) Filed: Dec. 18, 2002

(65) Prior Publication Data

US 2003/0123837 A1 Jul. 3, 2003

(30) Foreign Application Priority Data

Dec. 19, 2001 (JP) .............................. 2001-385523

(51) Int. Cl.$^7$ ............................................... G02B 6/36
(52) U.S. Cl. ....................................... 385/137; 385/78
(58) Field of Search ............................. 385/120, 137, 385/60–68, 78–85, 72

(56) References Cited

U.S. PATENT DOCUMENTS

| | | | | |
|---|---|---|---|---|
| 4,753,510 A | * | 6/1988 | Sezerman | ..................... 385/61 |
| 5,317,655 A | | 5/1994 | Pan | ............................. 385/11 |
| 5,574,809 A | | 11/1996 | Watanabe et al. | ............. 385/31 |
| 6,406,584 B1 | * | 6/2002 | Grossman et al. | .......... 156/254 |
| 6,546,182 B2 | * | 4/2003 | Calvet et al. | ............... 385/139 |
| 6,595,698 B2 | * | 7/2003 | Gutierrez et al. | ............. 385/85 |
| 6,634,797 B2 | * | 10/2003 | Yang et al. | .................... 385/59 |
| 2003/0142923 A1 | * | 7/2003 | Geron et al. | .................. 385/83 |

FOREIGN PATENT DOCUMENTS

| | | | | |
|---|---|---|---|---|
| DE | 10056510 A1 | 6/2001 | ............ G02B 6/42 |
| DE | 19956464 C1 | 6/2001 | ............ G02B 6/36 |
| EP | 0043421 A1 | 1/1982 | ............ G02B 7/26 |

OTHER PUBLICATIONS

A.S. Morris III, "InSearch of Transparent Networks", IEEE Spectrum, Oct. 2001, pp. 47-51.
D.T. Nielson, et al., "Fully provisioned 112×112 micromechanical optical cross connect with 35.8Tb/s demonstrated capacity", OFC2000, PAPER-pd12-1, 2000.
K. Koyabu, et al., "Fabrication of two-dimensional fiber arrays using microferrules", IEEE Transactions on Components, Packaging, and Manufacturing Technology, Jan. 1998, pp. 11-19, vol. 21, No. 1.
M. Takaya, et al., "Design and performance of very high-density mulitfiber connectors employing monolithic 60-fiber furrules", IEEE Photonics Technology Letters, Nov. 1999, pp. 1446-1448, vol. 11, No. 11.
Schroeder, C.M., "Accurate silicon spacer chips for an optical-fiber cable connector", The Bell System Technical Journal, Jan. 1978, pp. 91-97, vol. 57, No. 1.

* cited by examiner

*Primary Examiner*—Akm Enayet Ullah
*Assistant Examiner*—Kevin S. Wood
(74) *Attorney, Agent, or Firm*—Ben J. Yorks; Irell & Manella LLP

(57) ABSTRACT

An optical fiber array includes an alignment substrate, a plurality of ferrules, and a plurality of optical fibers. The alignment substrate has a plurality of guide holes which are two-dimensionally arrayed and extend through the substrate. The ferrules are respectively inserted into the guide holes in the same direction and have through holes in the central portions. The optical fibers are fitted and held in the respective through holes. The guide hole is formed into a cylindrical shape having a diameter substantially equal to the outer diameter of the ferrule. The light incident/exit end face of the optical fiber is exposed on one end face of the ferrule.

8 Claims, 7 Drawing Sheets

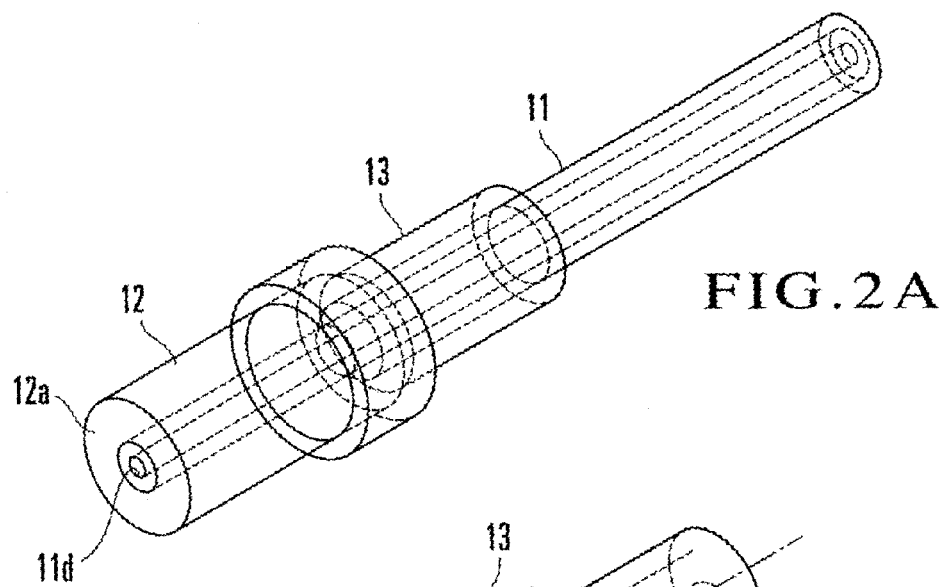
FIG.2A
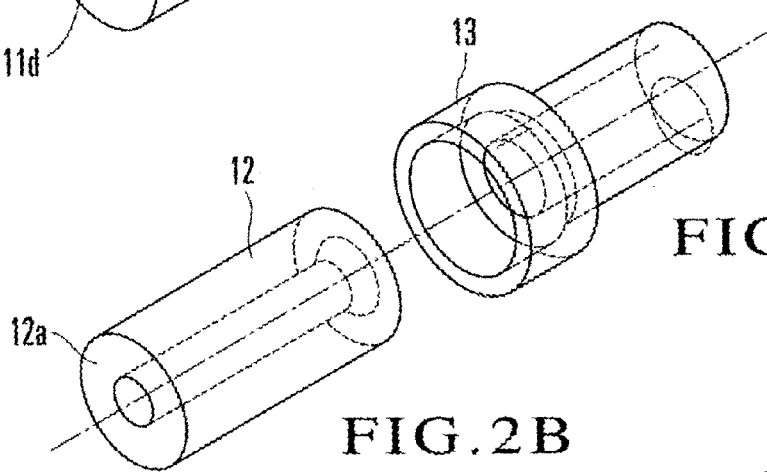
FIG.2C
FIG.2B
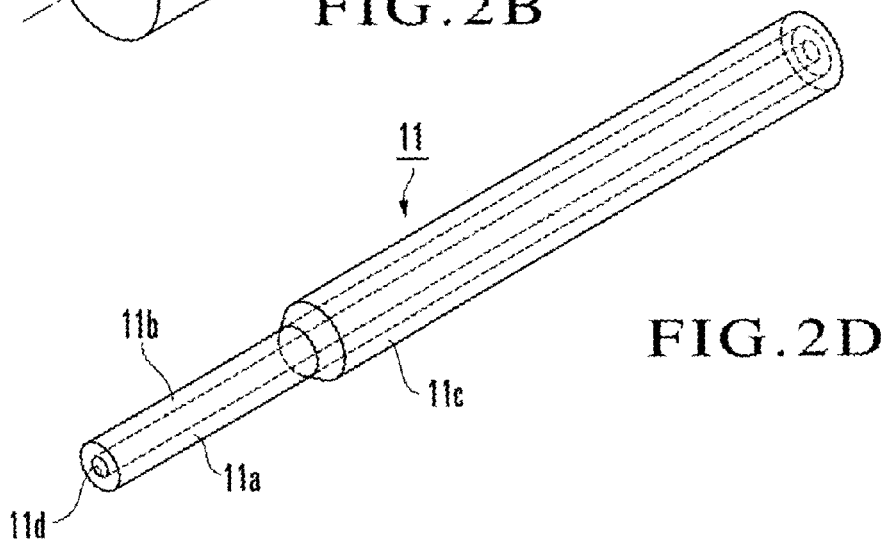
FIG.2D

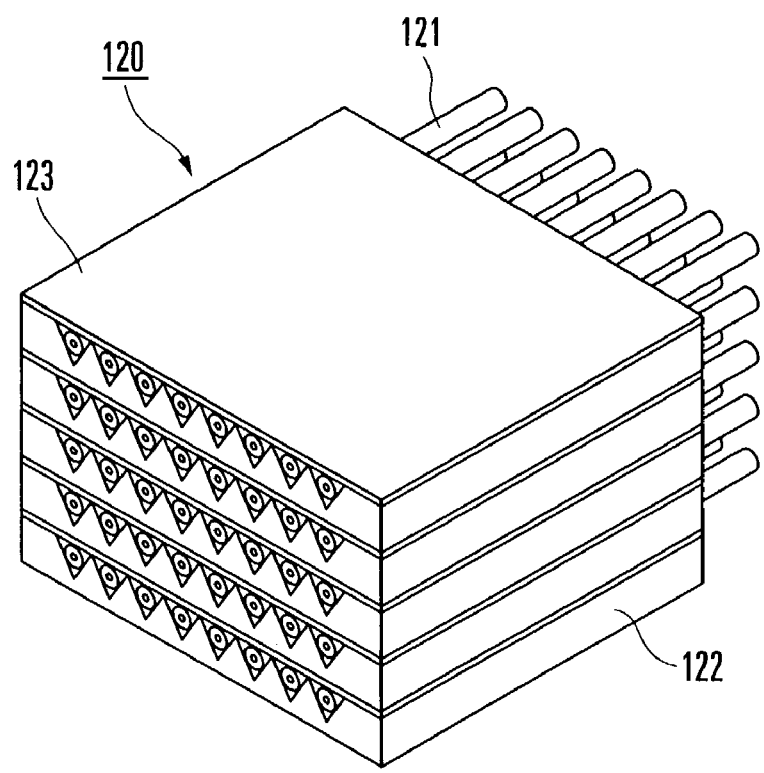
F I G. 8
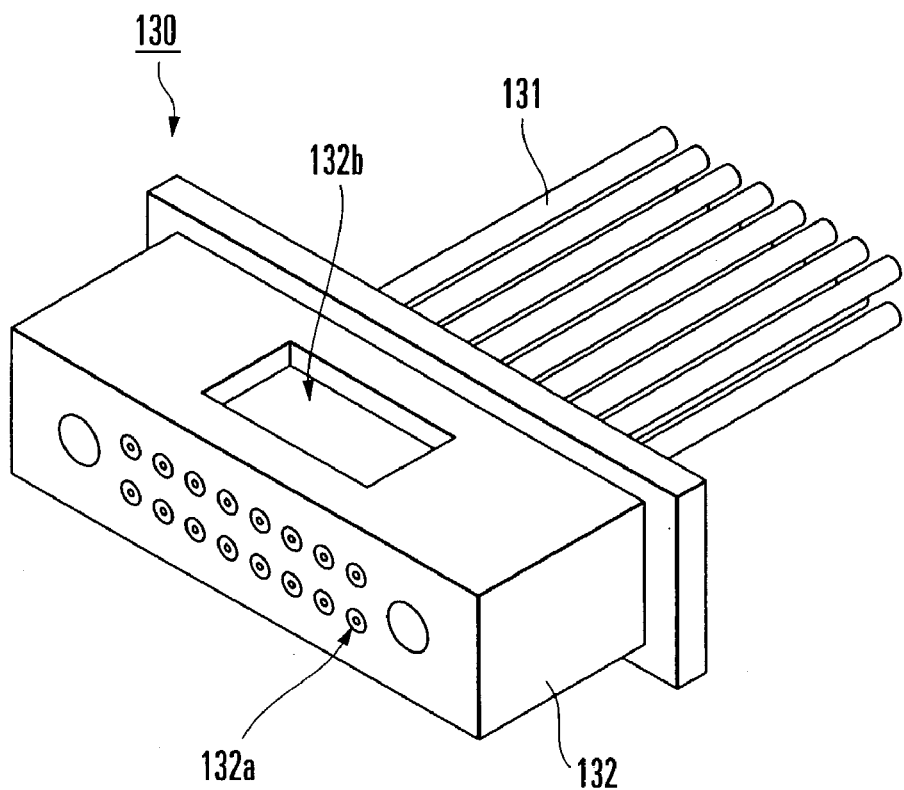
F I G. 9

OPTICAL FIBER ARRAY

BACKGROUND OF THE INVENTION

The present invention relates to an optical fiber array as a component of an optical switch, an isolator, the input/output portion of an optical connection device, a semiconductor laser, an optical coupling component between a photodiode and an optical fiber, or a multicore optical connector.

With an abrupt increase in data traffic, a strong demand has arisen for an increase in the capacity of a trunk network. In this trunk network, a large-capacity optical network using a WDM (Wavelength Division Multiplexing) technique has already been introduced for data transmission equipment. However, the following scheme is used for a node portion. First, an optical signal is temporarily converted into an electrical signal, and paths are switched by a switch using a conventional electric circuit. Then, the signal is converted into an optical signal again to be returned to the data transmission equipment.

It is pointed out that such a device for converting optical and electrical signals will greatly increase in cost and power consumption with an improvement in signal bandwidth (see non-patent reference 1: A. S. Morris III, "In search of transparent networks", IEEE Spectrum, pp. 47–51 (October 2001)). For this reason, studies have been made on the use of an optical switch designed to switch an optical signal without any optical and electrical signal convertor. A free-space type optical switch is, in particular, small, which uses a light beam for connection (optical connection) inside a switch or connection between switches without using any optical waveguide medium as wiring inside the optical switch, and hence the practical application of the optical switch to a switch portion of a large-scale network router has been studied.

FIG. 7 shows such a conventional free-space type optical switch (see non-patent reference 2: D. T. Neilson et al., "Fully provisioned 112×112 micro-mechanical optical cross connect with 35.8 Tb/s demonstrated capacity", OFC2000. paper-PD12–1, (2000)).

An optical switch 110 is comprised of an optical fiber array 111, microlens array 112, micro-tilt mirror array 113, and stationary mirror 114. The optical fiber array 111 is designed such that optical fibers are two- or one-dimensionally aligned/arranged at predetermined intervals by using a fiber aligning member. The microlens array 112 is designed such that microlenses are two- or one-dimensionally aligned/arranged at predetermined intervals like the optical fiber array.

The micro-tilt mirror array 113 is designed such that a plurality of micro-tilt mirrors as active elements which are formed on a semiconductor wafer by using a micromachining technique are one- or two-dimensionally arrayed. An inclination angle θ of the mirror surface of each micro-tilt mirror can be dynamically changed. For the sake of simplicity, FIG. 7 shows each component as a one-dimensional array.

In this conventional free-space type optical switch 110, an optical signal 100 emerging from each optical fiber of the optical fiber array 111 is converted into collimated light by a corresponding microlens of the microlens array 112 and reflected by a corresponding micro-tilt mirror of the micro-tilt mirror array 113. The light is then reflected by the stationary mirror 114 and reflected again by a micro-tilt mirror of the micro-tilt mirror array 113. The reflected light is finally focused on an optical fiber of the optical fiber array 111 via a microlens of the microlens array 112.

In the optical switch 110 having the above arrangement, by adjusting the inclination angle θ of the micro-tilt mirror of the micro-tilt mirror array 113, the traveling direction of the optical signal 100 is switched to guide the optical signal 100 to the target optical fiber of the optical fiber array 111. This optical system constituted by the optical fiber and microlens, which is used for conversion or focusing for the optical fiber and a light beam, is generally called an optical collimator.

In the above optical switch 110, in addition to reflection losses at refractive-index boundaries between each optical component, the connection loss between input and output optical fibers dominantly includes the coupling loss between a light beam and the output optical fiber due to the inclination of the optical axis of the light beam which is caused by the beam-position displacement between the optical fiber and the microlens constituting an optical collimator, a clipping loss from a lens aperture, and a reflection loss at the refractive-index boundaries. The light beam that has undergone the optical axis inclination due to the beam-position displacement causes crosstalk between adjacent channels, resulting in a deterioration in optical channel quality.

In a two-dimensional collimator array, in particular, the amount of optical axis displacement between each optical fiber and a lens is greatly influenced by the optical fiber displacement in an optical fiber array. For this reason, in a two-dimensional collimator array, an improvement in array manufacturing precision is strongly required. Note that an apparatus using this optical collimator lens is not limited to an optical switch and is equally applied to an optical isolator using a light beam for connection and an optical interconnection apparatus. This array is also applied to a coupling portion between a semiconductor laser or photodiode and an optical fiber.

FIG. 8 shows a conventional two-dimensional optical fiber array used for a free-space type optical switch.

As shown in FIG. 8, a two-dimensional fiber array 120 is formed as follows. Optical fibers 121 are respectively inserted into V-groove portions of V-groove substrates 122 and aligned. The optical fibers 121 are temporarily fixed by fiber press plates 123 and fixed with an adhesive filled in air gaps between these components. The V-groove substrates 122 are stacked and boded with an adhesive. As the V-groove substrate 122, for example, a ceramic, glass, or silicon substrate in which V-groove portions are formed by using a high-precision machining technique is widely used. With this structure, the optical fiber displacement in the horizontal direction with respect to the substrate surface can be suppressed to 1 μm or less.

FIG. 9 shows the schematic structure of another conventional two-dimensional optical fiber array (MT type optical connector ferrule).

As shown in FIG. 9, a two-dimensional optical fiber array 130 has optical fibers 131 respectively inserted into alignment guide holes 132a of a ferrule 132 and fixed with an adhesive injected through an adhesive filling hole 132b. A polymer thermoplastic material (thermoplastic resin) exhibiting a small deformation amount at the time of thermal shrinking or after molding is used for the ferrule 132. The ferrule 132 is manufactured by a transfer-plastic molding technique of injecting the heated material into a mold and molding it by cooling. In general, plastic molding techniques represented by the transfer-plastic molding technique are suitable for mass production and allow high-precision optical fibers to be manufactured at a low cost.

In the two-dimensional fiber array 120 shown in FIG. 8, however, the following problems arise.

(1) First of all, when the V-groove substrates 122 are to be stacked on each other, the substrates are bonded after the substrates are positioned in the horizontal direction with respect to the substrates. The influences of the extend shrinking of an adhesive must be taken into consideration, and it is difficult to control the positions of the substrates in consideration of the shrinking. In the two-dimensional fiber array 120, therefore, an improvement in the positioning accuracy of the optical fibers 121 in the stacking direction of the substrates (the vertical direction with respect to the substrate surface) is limited.

(2) In addition, as the number of optical fibers 121 increases in the horizontal direction of the V-groove substrates 122 with an increase in scale, displacements of the optical fibers 121 are likely to occur due to the warpage of the V-groove substrates 122. As the number of V-groove substrates 122 stacked increases, displacements of the optical fibers 121 are likely to occur due to variations in thickness of the V-groove substrates 122 and the thickness of the adhesive. Even if the V-groove substrates 122 are formed with high dimensional precision, the overall optical fiber displacement increases due to a variation in the thickness of the adhesive.

(3) In general, each V-groove substrate 122 is manufactured by forming V-groove portions in, for example, a semiconductor, glass, or ceramic substrate by a high-precision machining technique or etching process. However, a manufacturing method using such a high-precision machining technique or process is not suitable for mass production, and hence it is difficult to reduce the manufacturing cost.

(4) Since the outer diameter of an optical fiber is as small as 125 μm, the optical fiber is very difficult to handle. Since such optical fibers that are difficult to handle are used, it is difficult to reduce the assembly cost for the two-dimensional fiber array 120 shown in FIG. 8.

In the two-dimensional optical fiber array 130 shown in FIG. 9, the following problems arise.

In general, anti-reflection coating films made of dielectric-multilayer films are formed on the refractive-index boundaries between air and optical fibers and lenses constituting optical collimators in order to eliminate the influences of reflection. In many cases, such anti-reflection coating films are formed by vapor deposition. In vapor deposition, in the process of forming films, objects on which the films are to be formed are left in a high-temperature environment of several hundred ° C. or higher.

When the ferrule 132 shown in FIG. 9 is to be used, the plurality of optical fibers 131 are inserted into the guide holes 132a and held by the ferrule 132. In this state, the light incident/exit end faces of the respective optical fibers 131 are polished and anti-reflection coating films are formed on the polished light incident/exit end faces. However, the glass-transition temperature of the thermoplastic resin used for the ferrule 132 is near 180 to 200° C., and hence it is technically difficult to form an anti-reflection coating film by vapor deposition in the presence of the ferrule 132.

SUMMARY OF THE INVENTION

The present invention has been made to solve the above problems, and has as its object to provide a two-dimensional optical fiber array with a small displacement of optical fibers at a low cost.

In order to accomplish the above object, according to the present invention, there is provided an optical fiber array comprising an alignment substrate having a plurality of guide holes which are two-dimensionally arrayed and extend through the substrate, a plurality of cylindrical ferrules which are respectively inserted into the guide holes in the same direction and have through holes in central portions, and a plurality of optical fibers fitted and held in the respective through holes, wherein the guide hole is formed into a cylindrical shape having a diameter substantially equal to an outer diameter of the ferrule, and a light incident/exit end face of the optical fiber is exposed on one end face of the ferrule.

BRIEF DESCRIPTION OF THE DRAWINGS

FIG. 2 is a perspective view showing each portion forming the optical fiber array in FIG. 1;

FIG. 8 is a perspective view showing the schematic structure of a conventional two-dimensional optical fiber array; and FIG. 9 is a perspective view showing the schematic structure of a conventional two-dimensional optical fiber array.

DESCRIPTION OF THE PREFERRED EMBODIMENTS

The present invention will be described in detail below with reference to the accompanying drawings.

[First Embodiment]

Figure 1:
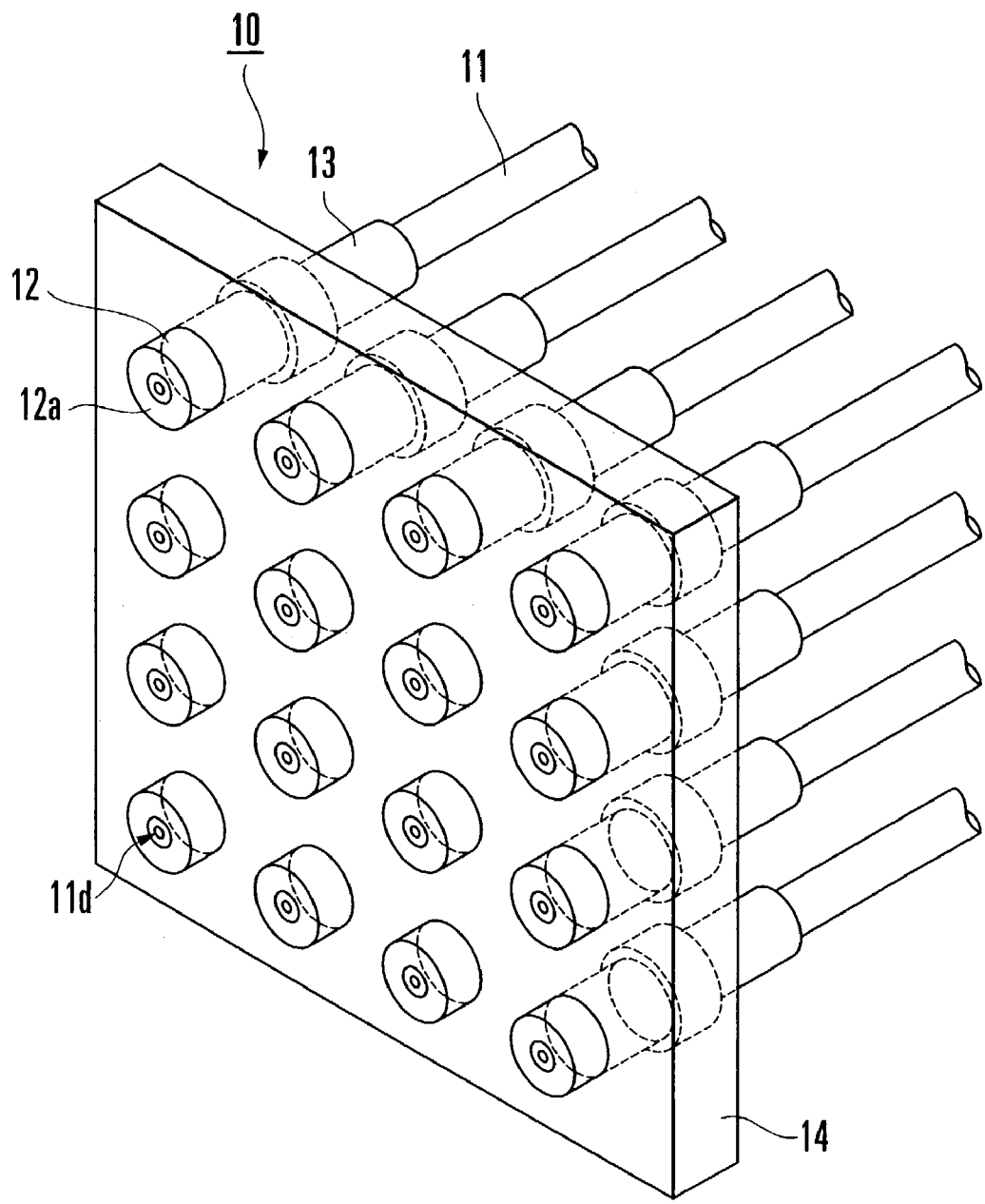
FIG. 1 is a perspective view showing the arrangement of an optical fiber array according to the first embodiment of the present invention.

An optical fiber array according to the first embodiment of the present invention will be described first. FIG. 1 shows the arrangement of an optical fiber array 10 according to this embodiment. The optical fiber array 10 has a plurality of optical fibers 11 arrayed by inserting cylindrical ferrules 12 attached to the distal end portions of the optical fibers 11 into through holes arrayed/formed in an alignment substrate 14. Each optical fiber 11 is fitted in a through hole formed in the central portion of the ferrule 12, and a light incident/exit end face 11d of the optical fiber 11 is exposed on the end face 12a side of the ferrule 12.

As shown in FIG. 2, a sheath 11c on the distal end portion of the optical fiber 11 is removed, and an exposed waveguide portion constituted by a core 11a and cladding 11b is fitted in the ferrule 12. On the side where the optical fiber 11 is inserted into the ferrule 12, a cylindrical tube 13 for protecting them partly covers the ferrule 12 and optical fiber 11. The tube 13 is constituted by a large-diameter portion and small-diameter portion. Part of the ferrule 12 is fitted in the large-diameter portion, whereas the optical fiber 11 is fitted in the small-diameter portion.

The ferrule 12 is a holding component for an optical fiber and commercially available. This commercially available ferrule is very high in precision, with the decenter amount, which is the displacement amount between the center of the inner diameter and the center of the outer diameter, being several μm or less.

Although not shown, the light incident/exit end face 11d of the optical fiber 11 fitted in the ferrule 12 is mirror-polished, and an anti-reflection coating film is formed on the polished end face. The light incident/exit end face 11d is flush with the end face 12a of the ferrule 12.

In this embodiment, as described above, since the ferrule 12 is made of a material with high glass-transition temperature, an anti-reflection coating film can be formed on the light incident/exit end face 11d of the optical fiber 11 by vapor deposition while the optical fiber 11 is held by the ferrule 12. In this case, an anti-reflection coating film is also formed on the end face 12a of the ferrule 12. When an anti-reflection coating film is also formed on the distal end portion of each ferrule 12 in this manner, the optical fiber array 10 can be applied to the input/output portion of an optical switch, an optical connector, and the like which are used in optical communication and the like.

Figure 3:
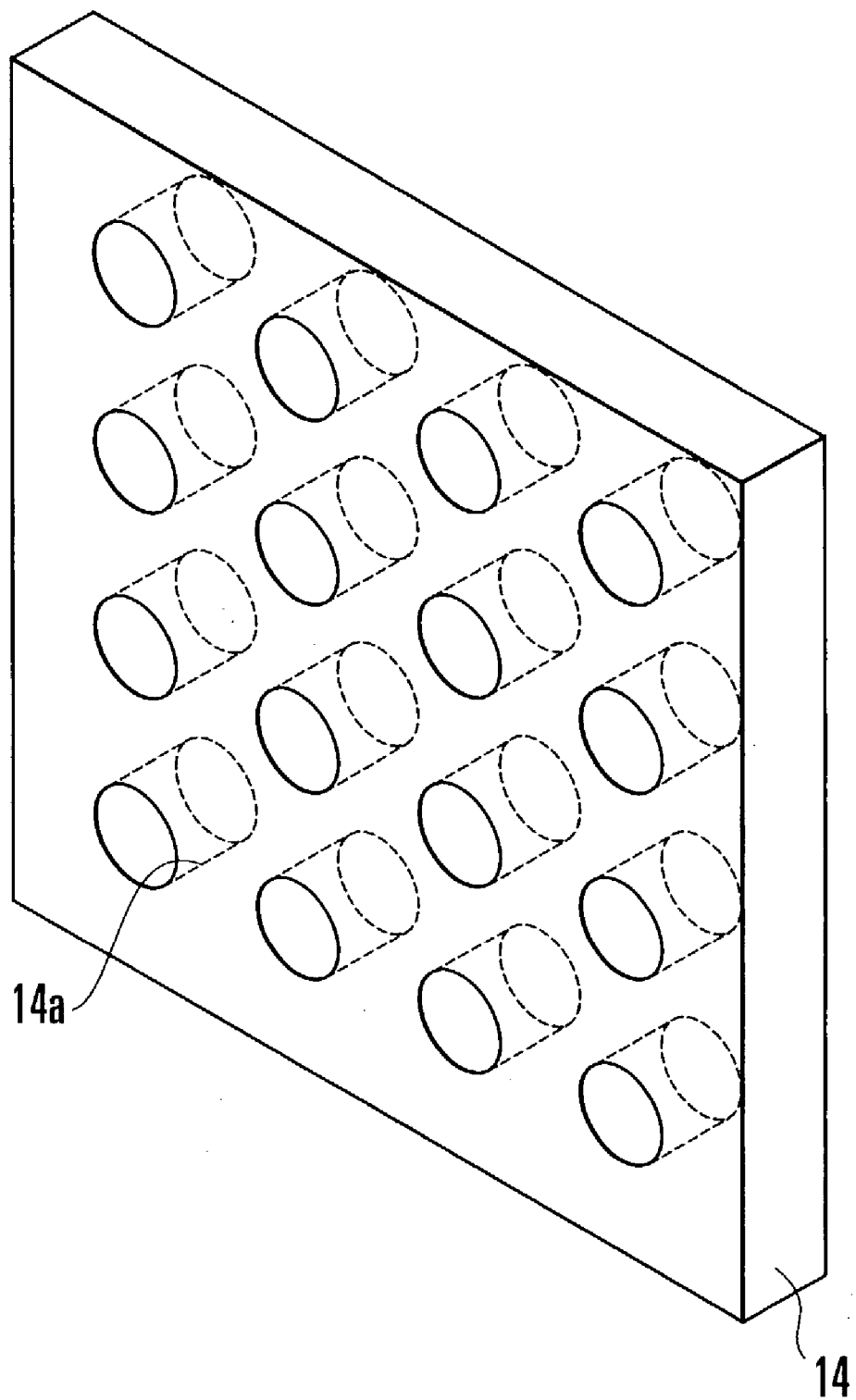
FIG. 3 is a perspective view showing the arrangement of an alignment substrate 14 as a component of the optical fiber array in FIG. 1.

The alignment substrate 14 is made of, for example, a thermoplastic resin, and has a plurality of guide holes 14a arrayed and formed as shown in FIG. 3. The diameter of the guide hole 14a corresponds to the outer diameter of the ferrule 12 and is almost equal to the outer diameter of the ferrule 12. When a thermoplastic resin is to be used, the alignment substrate 14 can be manufactured by, for example, transfer-plastic molding. Note that the alignment substrate 14 may be made of a metal, ceramic material, or glass.

In the optical fiber array 10 according to this embodiment described above, if, for example, the alignment substrate 14 is formed with high precision concerning, for example, the positions of the guide holes 14a, and the ferrules 12 are formed with high dimensional precision, the plurality of optical fibers 11 fixed to the alignment substrate 14 via the ferrules 12 are two-dimensionally arrayed with very little error. As described above, according to this embodiment, a two-dimensional optical fiber array with very little optical fiber displacement can be obtained by using the ferrules 12 and alignment substrate 14 (guide holes 14a) which are formed with high precision.

A procedure for assembling the ferrules 12 and alignment substrate 14 in the optical fiber array 10 according to the above embodiment will be described next with reference to FIGS. 4A to 4C.

Figure 4A:
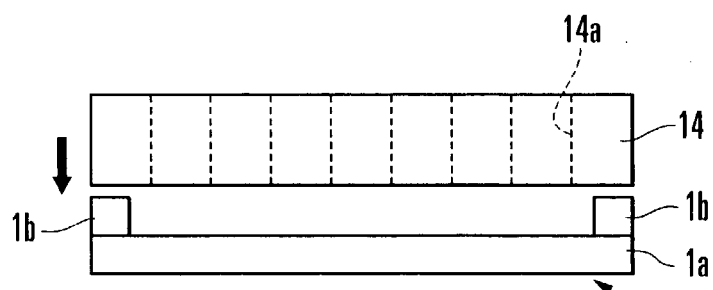
FIGS. 4A to 4C are views for explaining a procedure for assembling the optical fiber array in FIG. 1.

First of all, as shown in FIG. 4A, the alignment substrate 14 is temporarily fixed on a block 1 formed by stacking a reference substrate (optical flat) 1a and spacer 1b. The alignment substrate 14 may be temporarily fixed by using an adhesive with weak adhesive strength.

Figure 4B:
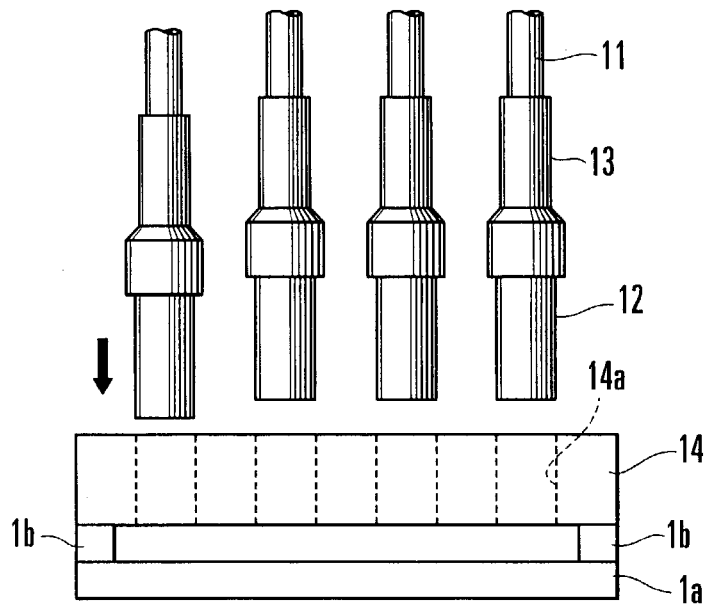

As shown in FIG. 4B, each ferrule 12 is inserted into the guide hole 14a of the alignment substrate 14 with a pressure such that the distal end of the ferrule 12 comes into contact with the upper surface of the reference substrate 1a of the block 1.

Figure 4C:
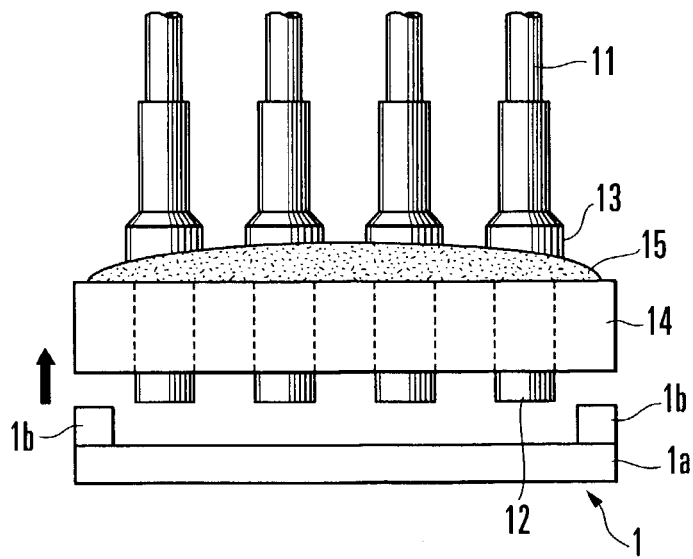

As shown in FIG. 4C, the joining area between the ferrules 12 and the alignment substrate 14 is coated with an adhesive 15 to fix each ferrule 12 to the alignment substrate 14. Thereafter, the alignment substrate 14 is removed from the block 1. With this process, the optical fiber array 10 can be manufactured. In the manufactured optical fiber array 10, the end faces 12a of the ferrules 12, i.e., the light incident/exit end faces 11d of the optical fibers 11, are in the same plane.

In this manner, the optical fiber array 10 according to this embodiment can be easily manufactured. According to the embodiment, therefore, a two-dimensional optical fiber array with very little optical fiber displacement can be obtained at a low cost by using the ferrules 12 and alignment substrate 14 (guide holes 14a) which are formed with high dimensional precision.

In this embodiment, the block 1 obtained by stacking the reference substrate 1a and spacer 1b is used to manufacture the optical fiber array 10 having the ferrules 12 whose ends protrude from the alignment substrate 14. However, the present invention is not limited to this. If, for example, only the reference substrate 1a is used, from which the spacer 1b is removed, an optical fiber array can be manufactured, in which the end faces 12a of the ferrules 12 are flush with the surface of the alignment substrate. Note that the exit end faces 11d of the respective optical fibers 11 need not be flush with each other.

[Second Embodiment]

Figure 5:
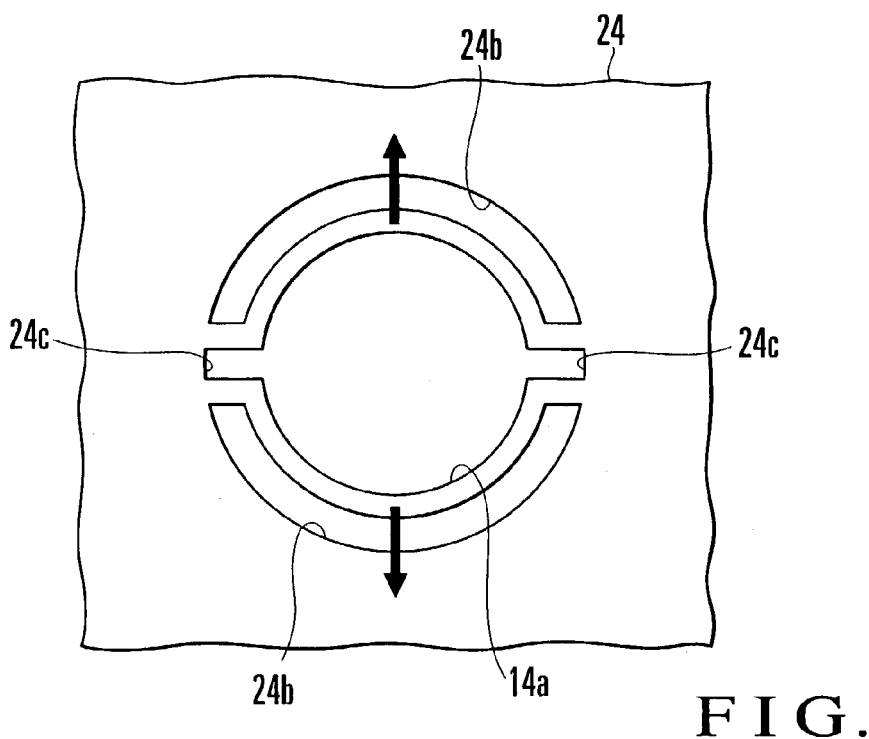
FIG. 5 is an enlarged plan view of a portion of an alignment substrate as a component of an optical fiber array according to the second embodiment of the present invention.

An optical fiber array according to the second embodiment of the present invention will be described next. FIG. 5 shows an alignment substrate 24 as a component of the optical fiber array of this embodiment. The same reference numerals as in the first embodiment denote the same parts in the second embodiment, and a repetitive description will be avoided.

As shown in FIG. 5, each guide hole 14a of the alignment substrate 24 has one pair of arcuated buffer slits 24b which are formed along the periphery of the guide hole 14a. In addition, notches 24c communicating with the guide hole 14a are formed between the end portions of the pair of buffer slits 24b. When the ferrule 12 shown in FIGS. 1 and 2 is inserted into the guide hole 14a, these buffer slits 24b and notches 24c serve as buffer means.

The alignment substrate 24 having the buffer slits 24b and the like allows the ferrules 12 to be easily inserted into the guide holes 14a. Assume that the outer diameter of the ferrule 12 is slightly larger than the diameter of the guide hole 14a. In this case, when the ferrule 12 is inserted into the guide hole 14a, the portions between the buffer slits 24b and the guide hole 14a elastically deform. As a result, the buffer slits 24b narrow, and the guide hole 14a enlarges. According to this embodiment, this makes it possible to easily insert the ferrule 12 into the guide hole 14a.

In the first embodiment, if the diameter of the guide hole 14a of the alignment substrate 14 is almost equal to the outer diameter of the ferrule 12, it is difficult to smoothly insert the ferrule 12 into the guide hole 14a. For this reason, when the alignment substrate 14 shown in FIG. 3 is to be used, the ferrules 12 and alignment substrate 14 (guide holes 14a) must be molded with high precision. In contrast, in this embodiment, since the guide hole 14a has the above buffer means, even if the outer diameter of the ferrule 12 is slightly larger than the diameter of the guide hole 14a, such an error is buffered by the buffer means.

As a consequence, according to this embodiment, even if the ferrules 12 and alignment substrate 24 are not molded with as high precision as that in the first embodiment, the ferrules 12 can be arrayed on the alignment substrate 24 with high precision. As a consequence, in this embodiment as well, a plurality of optical fibers 11 can be two-dimensionally arrayed with very little error.

According to this embodiment, therefore, in addition to the same effects as those of the first embodiment, a further reduction in cost can be attained because the ferrules 12 and alignment substrate 24 need not be molded with as high precision as that in the first embodiment.

[Third Embodiment]

Figure 6:
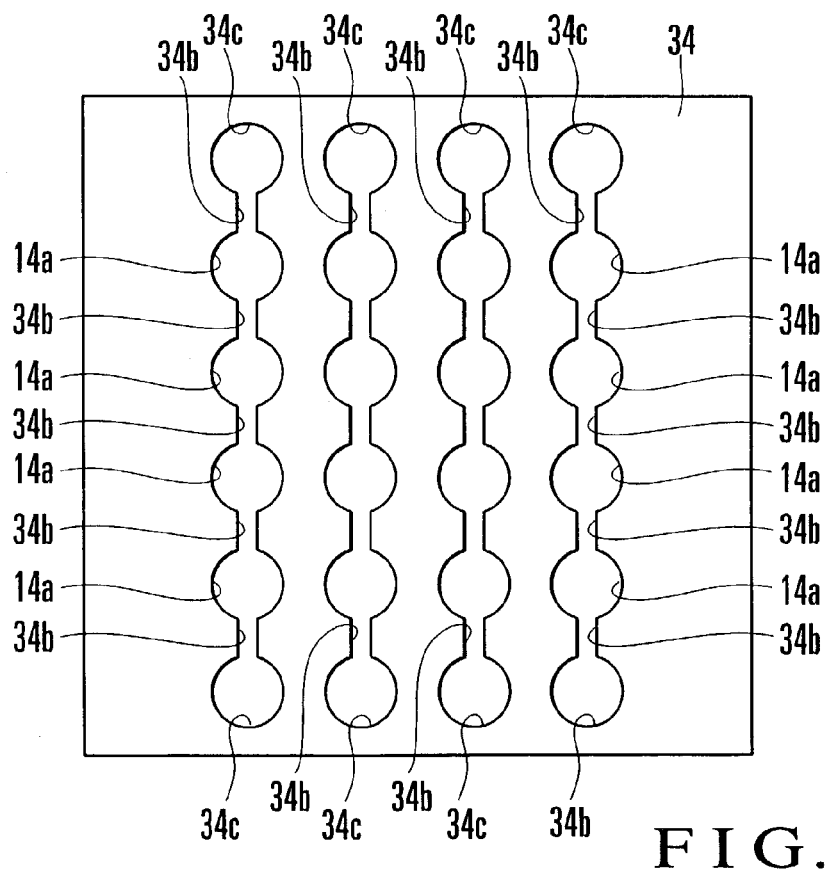
FIG. 6 is a plan view showing the schematic arrangement of an alignment substrate as a component of an optical fiber array according to the third embodiment of the present invention.
Figure 7:
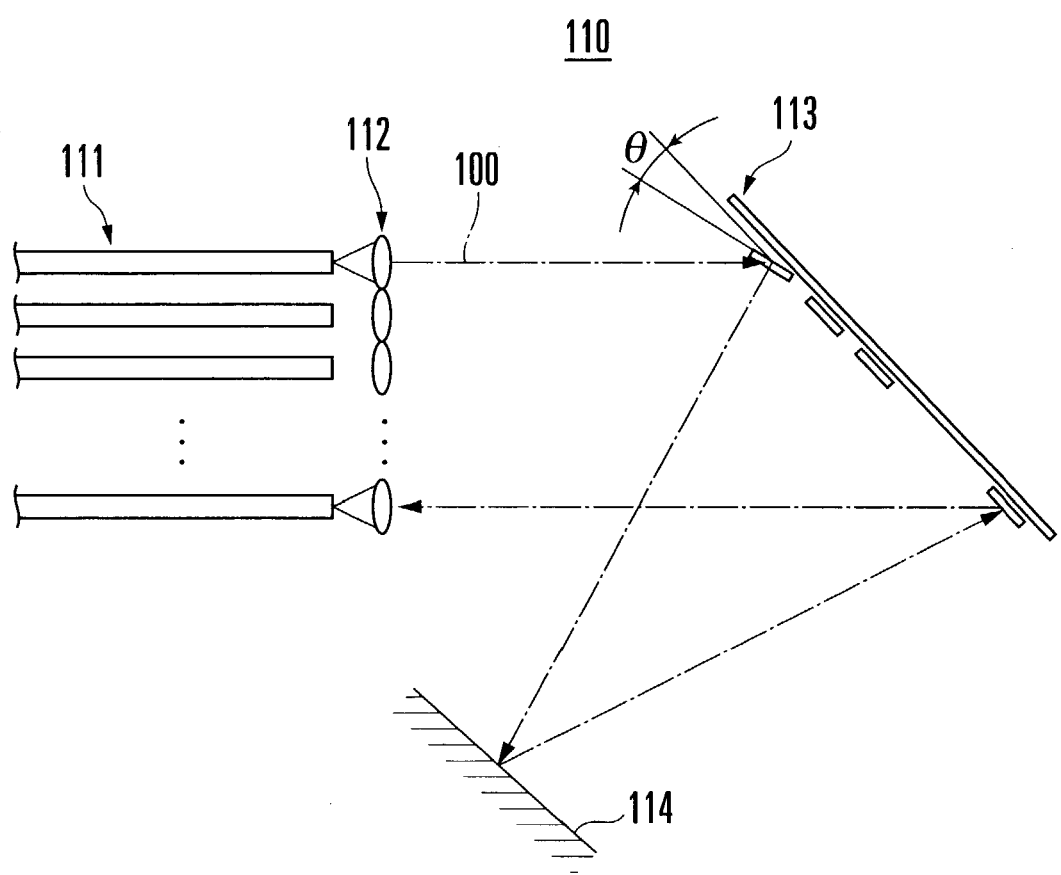
FIG. 7 is a view showing the schematic arrangement of a free-space type optical switch.

The third embodiment of the present invention will be described next. FIG. 6 shows an alignment substrate 34 as a component of an optical fiber array according to the third embodiment. The same reference numerals as in the first and second embodiments denote the same parts in the third embodiment, and a repetitive description will be avoided.

As shown in FIG. 6, the alignment substrate 34 has buffer holes 34c formed along each array of guide holes 14a near the peripheral ends of the alignment substrate 34 in one array direction of the guide holes 14a (the vertical direction in FIG. 6). In addition, the alignment substrate 34 has buffer slits 34b between the adjacent guide holes 14a and between the guide holes 14a and the buffer holes 34c. The buffer slits 34b make these holes communicate with each other. When the ferrules 12 shown in FIGS. 1 and 2 are inserted into the guide holes 14a, the buffer slits 34b and buffer holes 34c serve as buffer means.

In the alignment substrate 34 in which the buffer slits 34b and the like are formed, even if the outer diameter of the ferrule 12 is slightly larger than the diameter of the guide hole 14a, when the ferrule 12 is inserted into the guide hole 14a, the portions between the guide holes 14a elastically deform to make the buffer slit 34b narrow, and the guide hole 14a enlarges. As a consequence, the ferrule 12 can be easily inserted into the guide hole 14a.

As described above, in this embodiment, the error between the outer diameter of the ferrule 12 and the diameter of the guide hole 14a is buffered by forming the buffer slit 34b between the adjacent guide holes 14a.

In the second embodiment described above, when the interval between the adjacent guide holes 14a is to be greatly reduced, the arcuated buffer slits 24b are formed between the adjacent guide holes 14a. This requires a highly advanced molding technique. In contrast, in this embodiment, since only the buffer slits 34b that make the guide holes 14a communicate with each other are formed, the alignment substrate 34 can be manufactured by a simple molding technique.

According to this embodiment, therefore, in addition to the same effects as those of the second embodiment, a reduction in cost can be attained even if the interval between the adjacent ferrules 12 is reduced, because a molding technique simpler than that used in the second embodiment can be used.

As has been described above, according to the present invention, optical fibers are fitted in ferrules, and then inserted in guide holes formed in an alignment substrate. The positioning accuracy of the optical fibers is therefore determined by the arrangement precision of the guide holes arrayed in the alignment substrate and the dimensional precision of the ferrules. As a consequence, according to the present invention, a two-dimensional optical fiber array with very little optical fiber displacement can be provided at a low cost.

According to an embodiment of the present invention, a plurality of guide holes are formed in an alignment substrate made of a polymer thermoplastic material (thermoplastic resin), and cylindrical ferrules which are made of a material having a high glass-transition temperature and hold optical fibers are inserted into the guide holes, thereby forming an optical fiber array. This makes it possible to greatly reduce optical fiber displacement at a low cost. An anti-reflection coating can be formed on the light incident/exit end faces of the optical fibers as well as the distal ends of the ferrules. When the anti-reflection coating is formed on the distal end portions of the ferrules, this optical fiber array can be applied to the input/output portion of an optical switch, an optical connector, and the like which are used for optical communication and the like.

According to another embodiment of the present invention, the arrangement of the optical fiber array described above includes buffer means for buffering the errors between the diameters of the guide holes in the alignment substrate and the outer diameters of the ferrules. For example, the buffer means may include arcuated buffer slits formed around the guide holes in the alignment substrate along the peripheries of the guide holes. With this structure, even if ferrules and alignment substrate are not molded with high precision, the optical fiber displacement can be greatly reduced. This makes it possible to provide an optical fiber array at a lower cost.

In addition, for example, the above buffer means can be formed from buffer holes formed along a guide hole array near peripheral ends of the alignment substrate and buffer slits which are formed between the adjacent guide holes in the alignment substrate and between the buffer holes and the guide holes and make the holes communicate with each other. With this structure, even when the interval between the adjacent ferrules (optical fibers) is to be greatly reduced, the optical fiber displacement can be greatly reduced without molding the ferrules and alignment substrate with high precision. This makes it possible to provide an optical fiber array at a lower cost.

If, for example, an alignment substrate is manufactured by the transfer-plastic molding technique in either of the arrangements of the optical fiber arrays described above, it is easy to greatly reduce the optical fiber displacement at a low cost.

What is claimed is:

1. An optical fiber array characterized by comprising:
    an alignment substrate having a plurality of guide holes which are two dimensionally arrayed and extend through said substrate;
    a plurality of cylindrical ferrules which are respectively inserted into the guide holes in the same direction and have through holes in central portions and attached to said alignment substrate;
    a plurality of optical fibers fitted and held in the respective through holes,
    wherein the guide hole is formed into a cylindrical shape having a diameter substantially equal to an outer diameter of the ferrule,
    a light incident/exit end face of said optical fiber is exposed on one end face of said ferrule; and,
    buffer means for buffering a dimensional error between the diameter of the guide hole in said alignment substrate and the outer diameter of said ferrule.

2. An array according to claim 1, wherein said ferrule is made of a material having a high glass transition temperature.

3. An array according to claim 1, wherein said buffer means comprises arcuated buffer slits formed around the guide hole in said alignment substrate along a periphery of the guide hole.

4. An array according to claim 1, wherein said buffer means comprises:
    a buffer hole formed near a peripheral end of said alignment substrate along an array of the guide holes; and
    buffer slits which are formed between the adjacent guide holes in said alignment substrate and between the buffer hole and the guide hole and make the holes communicate with each other.

5. An array according to claim 1, wherein an anti-reflection coating film is formed on distal end portions of said ferrules.

6. An array according to claim 1, wherein said alignment substrate is manufactured by a transfer plastic molding technique.

7. An array according to claim 1, wherein said alignment substrate is made of a thermoplastic resin.

8. An array according to claim 1, further comprising an anti-reflection coating film formed on the light incident/exit end faces of said optical fibers.

* * * * *